(12) United States Patent
Luo et al.

(10) Patent No.: US 11,852,794 B2
(45) Date of Patent: Dec. 26, 2023

(54) HIGH-THROUGHPUT OPTICAL SECTIONING IMAGING METHOD AND IMAGING SYSTEM

(71) Applicant: HUST-SUZHOU INSTITUTE FOR BRAINSMATICS, Suzhou Jiangsu (CN)

(72) Inventors: Qingming Luo, Suzhou Jiangsu (CN); Jing Yuan, Suzhou Jiangsu (CN); Qiuyuan Zhong, Suzhou Jiangsu (CN); Rui Jin, Suzhou Jiangsu (CN); Hui Gong, Suzhou Jiangsu (CN)

(73) Assignee: HUST-SUZHOU INSTITUTE FOR BRAINSMATICS, Jiangsu (CN)

( * ) Notice: Subject to any disclaimer, the term of this patent is extended or adjusted under 35 U.S.C. 154(b) by 468 days.

(21) Appl. No.: 17/302,329

(22) Filed: Apr. 30, 2021

(65) Prior Publication Data
US 2021/0311292 A1 Oct. 7, 2021

Related U.S. Application Data

(63) Continuation of application No. PCT/CN2019/098364, filed on Jul. 30, 2019.

(30) Foreign Application Priority Data

Nov. 1, 2018 (CN) .......................... 201811297110.3

(51) Int. Cl.
*G02B 21/00* (2006.01)
*G01N 21/64* (2006.01)
*G01N 21/84* (2006.01)

(52) U.S. Cl.
CPC ....... *G02B 21/008* (2013.01); *G01N 21/6428* (2013.01); *G01N 21/84* (2013.01); *G02B 21/0036* (2013.01); *G02B 21/0076* (2013.01)

(58) Field of Classification Search
CPC ... G02B 21/008; G01N 21/6428; G01N 21/84
See application file for complete search history.

(56) References Cited

U.S. PATENT DOCUMENTS

| 3,303,319 | A | 2/1967 | Steigerwald |
| 3,622,743 | A | 11/1971 | Muncheryan |

(Continued)

FOREIGN PATENT DOCUMENTS

| CA | 2728950 A1 | 3/2012 |
| CN | 103207449 | 7/2013 |

(Continued)

OTHER PUBLICATIONS

Request for the Submission of an Opinion from related Korean Appln. No. 10-2021-7016622, dated Mar. 27, 2023. English translation attached.

(Continued)

*Primary Examiner* — Hugh Maupin
(74) *Attorney, Agent, or Firm* — Grossman, Tucker, Perreault & Pfleger, PLLC

(57) ABSTRACT

A high-throughput optical sectioning imaging method and imaging system. The method includes: modulating a light beam into a modulated light beam capable of being focused on a focal plane of an objective lens and being defocused on a defocusing plane of the objective lens, the modulated light beam having incompletely identical modulated intensities on the focal plane of the objective lens; imaging, in different rows of pixels, a sample under illumination of the modulated light beam to obtain sample images in the different rows of pixels; obtaining focal plane images of sample images in the different rows of pixels by demodulation of the sample images according to a demodulation algorithm. The system includes a light beam modulation module, an imaging module and a demodulation module.

10 Claims, 5 Drawing Sheets

(56) References Cited

U.S. PATENT DOCUMENTS

| | | | |
|---|---|---|---|
| 3,699,334 | A | 10/1972 | Cohen et al. |
| 4,618,262 | A | 10/1986 | Maydan et al. |
| 4,733,397 | A | 3/1988 | Gallagher et al. |
| 4,859,826 | A | 8/1989 | Hess, III |
| 4,892,098 | A | 1/1990 | Sauer |
| 5,339,323 | A | 8/1994 | Hunter et al. |
| 5,387,969 | A | 2/1995 | Marantette |
| 5,446,547 | A | 8/1995 | Guenther et al. |
| 5,631,171 | A | 5/1997 | Sandstrom et al. |
| 5,961,861 | A | 10/1999 | McCay et al. |
| 6,004,314 | A | 12/1999 | Wei et al. |
| 6,043,870 | A | 3/2000 | Chen |
| 6,454,761 | B1 | 9/2002 | Freedman |
| 6,485,413 | B1 | 11/2002 | Boppart et al. |
| 6,669,686 | B1 | 12/2003 | Singh |
| 6,710,283 | B2 | 3/2004 | Mori et al. |
| 6,755,819 | B1 | 6/2004 | Waelti |
| 6,763,259 | B1 | 7/2004 | Hauger et al. |
| 6,787,733 | B2 | 9/2004 | Lubatschowski et al. |
| 6,869,429 | B2 | 3/2005 | Singh |
| 7,411,682 | B2 | 8/2008 | Moshe |
| 7,436,520 | B1 | 10/2008 | Doerband |
| 7,619,746 | B2 | 11/2009 | De Lega |
| 7,688,453 | B2 | 3/2010 | Williby et al. |
| 7,884,924 | B2 | 2/2011 | Numata et al. |
| 7,924,435 | B2 | 4/2011 | Colonna De Lega et al. |
| 8,264,694 | B2 | 9/2012 | Mann et al. |
| 8,410,392 | B2 | 4/2013 | Kogel-Hollacher et al. |
| 8,604,382 | B2 | 12/2013 | Yano et al. |
| 8,653,406 | B2 | 2/2014 | Gubler et al. |
| 8,735,768 | B2 | 5/2014 | Urashima et al. |
| 8,822,875 | B2 | 9/2014 | Webster et al. |
| 8,982,339 | B2 | 3/2015 | Schoenleber et al. |
| 9,457,428 | B2 | 10/2016 | Webster et al. |
| 2001/0008230 | A1 | 7/2001 | Keicher et al. |
| 2002/0153500 | A1 | 10/2002 | Fordahl et al. |
| 2003/0132394 | A1* | 7/2003 | Wolleschensky .. G01N 21/6458 250/458.1 |
| 2003/0196994 | A1 | 10/2003 | Nikitin et al. |
| 2003/0227514 | A1 | 12/2003 | Nakashima |
| 2005/0027199 | A1 | 2/2005 | Clarke |
| 2006/0179992 | A1 | 8/2006 | Kermani |
| 2007/0229843 | A1 | 10/2007 | Sesko |
| 2008/0017619 | A1 | 1/2008 | Yamakawa et al. |
| 2008/0281413 | A1 | 11/2008 | Culbertson et al. |
| 2010/0133247 | A1 | 6/2010 | Mazumder et al. |
| 2010/0142780 | A1 | 6/2010 | Yasuno et al. |
| 2010/0155375 | A1 | 6/2010 | Dietz et al. |
| 2010/0224796 | A1* | 9/2010 | Mertz ............. G02B 21/0056 250/226 |
| 2010/0324542 | A1 | 12/2010 | Kurtz |
| 2011/0222024 | A1 | 9/2011 | Lu et al. |
| 2011/0284508 | A1 | 11/2011 | Miura et al. |
| 2012/0138586 | A1 | 6/2012 | Webster et al. |
| 2012/0285936 | A1 | 11/2012 | Urashima et al. |
| 2012/0318775 | A1 | 12/2012 | Schwarz |
| 2013/0120740 | A1 | 5/2013 | Schoenleber |
| 2014/0275986 | A1 | 9/2014 | Vertikov |
| 2014/0313576 | A1* | 10/2014 | Uhl ................. G02B 21/0032 359/385 |
| 2015/0338210 | A1 | 11/2015 | Lessmueller et al. |
| 2016/0039045 | A1 | 2/2016 | Webster |
| 2016/0059347 | A1 | 3/2016 | Kogel-Hollacher et al. |
| 2016/0161752 | A1 | 6/2016 | Negoita et al. |
| 2016/0202045 | A1 | 7/2016 | Schoenleber et al. |
| 2017/0120337 | A1 | 5/2017 | Kanko et al. |
| 2017/0120377 | A1 | 5/2017 | Webster et al. |

FOREIGN PATENT DOCUMENTS

| | | |
|---|---|---|
| CN | 104159094 | 11/2014 |
| CN | 105371757 | 3/2016 |
| CN | 207516243 | 6/2018 |
| DE | 10155203 A1 | 6/2003 |
| DE | 102007032743 A1 | 1/2009 |
| DE | 102010016862 B3 | 9/2011 |
| EP | 1238744 A1 | 9/2002 |
| EP | 1977850 A1 | 10/2008 |
| KR | 1020130115891 | 10/2013 |
| WO | 2007038975 A1 | 4/2007 |
| WO | 2012037694 A2 | 3/2012 |
| WO | 2012152881 A1 | 11/2012 |
| WO | 2013102912 A2 | 7/2013 |

OTHER PUBLICATIONS

International Search Report and Written Opinion, dated May 17, 2018, in related International Application No. PCT/US18/14218.

Matsunawa et al.; "Dynamics of Keyhole and Molten Pool in Laser Welding"; Journal of Laser Applications 10, 247 (1998); https://doi.org/10.2351/1.521858.

Gu, Hongping; "Real-Time Monitoring and Adaptive Control of CO2 Laser Beam Welding"; A thesis presented to the University of Waterloo; Waterloo, Ontario, Canada, 1998.

Postma, S., Postma, S., Aarts, R. G. K. M., Meijer, J., & Jonker, J. B. (2002). "Penetration control in laser welding of sheet metal." Journal of Laser Applications.

Fabbro et al; "Keyhole Modeling During Laser Welding"; Journal of Applied Physics; vol. 87; No. 9; May 1, 2000; pp. 4075-4083.

Bardin et al; "Process Control of Laser Keyhole Welding"; International Congress of Applications of Lasers and Electro-Optics 2004; 1008 (2004); doi: 10.2351/1.5060185; Published by Laser Institute of America; 11 pages.

Young, Thomas (1807). A Course of Lectures on Natural Philosophy and the Mechanical Arts.

Born, Max; Wolf, Emil (1999). Principles of Optics (7th expanded ed.).

Dilthey, U.; Handbuch zum BMBF-Projektverband "Qualifizierung von Laserverfahren" im Rahmen des Forderkonzeptes Laser 2000; DVS-Verl., 2000, ISBN 3-87155-906-7 along with English translation; pp. 117-120.

Annex from Communication dated Nov. 30, 2018 in corresponding European Patent Application No. 11826290.6.

Observations by third party mailed Jan. 31, 2019 in connection with corresponding European Patent Application No. 11826290.6.

Bautze et al; "Keyhole Depth is just a Distance"; Laser Technik Journal dated Apr. 2014, pp. 39-43.

Office Action dated Dec. 20, 2019 in related U.S. Appl. No. 16/007,377.

Office Action dated Dec. 20, 2019 in related U.S. Appl. No. 16/007,338.

International Search Report and Written Opinion for International Application No. PCT/CA2011/050599 dated Dec. 8, 2011.

Kanko, et al., "In Situ Morphology-Based Defect Detection of Selective Laser Melting through Inline Coherent Imaging", Journal of Materials Processing Technology 231, 488-500. Dec. 29, 2015.

Leung, et al., "Real-Time Coherent Imaging of Ultrafast Ablation", Optical Society of America, CThG4, 2009.

Ohmi, et al., "In-Situ Observation of Tissue Laser Ablation using Optical Coherence Tomography", Optical and Quantum Electronics, vol. 37, 1175-1183, 2005.

Vakoc, et al., "Real-Time Microscopic Visualization of Tissue Response to Laser Thermal Therapy", Journal of Biomedical Optics, vol. 12 (2), 020501-1-020501-3, Mar./Apr. 2007.

Weisner, M., et al., "Optical coherence tomography for process control of laser micromachining", Review of Scientific Instruments, vol. 81, 033705-1-033705-7 (2010).

Webster, P.J.L., et al., "Inter- and intrapulse dynamics and feedback control for laser machining", Optical Society of America, CF16 (2009).

Webster, P.J.L., et al., "In situ 24 kHz coherent imaging of morphology change in laser percussion drilling", Optics Letters, vol. 35, No. 5, 646-648 (2010).

Webster, P.J.L., et al., "High speed in situ depth profiling of ultrafast micromachining", Optics Express, vol. 15, No. 23, 14967-14972 (2007).

(56) References Cited

OTHER PUBLICATIONS

Yu, J.X.Z., et al., "High quality percussion drilling of silicon with a CW fiber laser", Proceedings of SPIE Photonics West: LASE, San Francisco, CA, (2010).

Muller, M.S., et al., "Ultrafast technology applied to optical coherence tomography" La Physique Au Canada, vol. 65, No. 2, 93-86 (2009).

Leung, B.Y.C., et al., "Real-time guidance of thermal and ultrashort pulsed laser ablation in hard tissue using inline coherent imaging", Lasers in Surgery and Medicine, vol. 44, No. 3, 249-256 (2012).

Webster, P.J.L., et al., "Automatic real-time guidance of laser machining with inline coherent imaging", J. Laser Appl., vol. 23, No. 2, 022001 (2011).

Buzug, T.M., et al., "Navigation concept for image-guided laser surgery", Proc Int. IEEE Conf. Mechatronics Robotics 1403-1408 (2004).

Hohlweg-Majert, B., et al., "Bone treatment laser-navigated surgery", Lasers Med. Sci., vol. 25(1), 67-71 (2010).

Stopp, S., et al., "A new concept for navigated laser surgery", Lasers Med. Sci., vol. 23(3), 261-266 (2008).

Stopp, S., et al., "A new approach for creating defined geometries by navigated laser ablation based on volumetric 3-D data", IEEE Trans. Biomed Eng., vol. 55(7), 1872-1880 (2008).

Rupprecht, S., et al., "Sensor-based laser ablation for tissue specific cutting: an experimental study", Lasers Med. Sci., vol. 19(2), 81-88 (2004).

Fercher, A.F., et al., "Optical coherence tomography—principles and applications", Rep. Prog. Phys., vol. 66(2), 239-303 (2003).

Boppart, S.A., et al., "High-resolution optical coherence tomography-guided laser ablation of surgical tissue", J. Surg. Res., vol. 82, 275-284 (1999).

Oh, W.Y., et al., "Ultrahigh-speed optical frequency domain imaging and application to laser ablation monitoring", Appl. Phys. Lett., vol. 88(10) 103902 (2006).

Wang, Y., et al., "Low-noise broadband light generation from optical fibers for use in high-resolution optical coherence tomography", J. Opt. Soc. Am. A., vol. 22(8), 1492-1499 (2005).

Bonora, S., et al., "Low-threshold ablation of enamel and dentin using Nd:YAG laser assisted with chromophone with different pulse shapes", Proc. SPIE, vol. 4313, 23-30 (2004).

Li, Z.Z., et al., "Bone ablation with Er:YAG and CO2 laser: study of thermal and acoustic effects", Las. Surg. Med., vol. 12(1), 79-85 (1992).

Leech, P.W., "Laser ablation of multilayered hot stamping foil", J. Mater. Process. Technol. 209, 4281-4285 (2009).

Lausten, R., et al., "On-the-fly depth profiling during ablation with ultrashort laser pulses: a tool for accurate micromachining and laser surgery", Appl. Phys. Lett. 79(6), 884-886 (2001).

Webster, P.J.L., et al., "In-situ localization of machining dynamics with coherent microscopy", Canadian Laser Application Network (CLAN) Workshop, Mar. 12, 2009.

Webster, P.J.L., et al., "Coaxial real-time metrology and gas assisted laser micromachining: process development, stochastic behavior and feedback control", Proceedings of SPIE Photonics West MOEMS 759003-758003-10, San Francisco, CA (2010).

Webster, P.J.L., et al., "Guidance of hard tissue ablation by forward-viewing optical coherence tomography", Proceedings of SPIE, vol. 7554, 75540Z-75540Z-6 (2010).

Lindner, M.W., et al., "Spectral Radar: Optical Coherence Tomography in the Fourier Domain", in: Handbook of Optical Coherence Tomography, edited by E. Bourna and G.J. Teamey, Marcel Dekker, New York, pp. 335-357 (2002).

Webster, P.J.L., et al., "High speed observation of ultrafast machining dynamics", in Conference on Lasers and Electro-Optics p. CMF6 Optical Society of America, San Jose, CA (2008).

Webster, P.J.L., et al., "Inline coherent imaging of laser micromachining", International Symposium on Optomechatronic Technologies, Toronto, ON (2010).

Fraser, J.M., "In-situ coherent imaging to monitor and control laser processing", Harvard University Colloquium (2011).

Hofer, B., et al., "Signal post processing in frequency domain OCT and OCM using a filter bank approach", Proc. SPIE 6443, 644300 (2007).

Hofer, B., et al., "Dispersion encoded full range frequency domain optical coherence tomography", Optics Express, vol. 17 (1), 7-24 (2009).

Leung, B.Y.C., et al., "Real time Coherent Imaging of Ultrafast Ablation", Department of Physics, Engineering Physics and Astronomy, Queen's University, Kingston, Ontario, Canada, Jun. 4, 2009.

Webster, P.J.L., et al., "Inter- and Intra-pulse Dynamics & Feedback Control for Laser Machining", Queen's University, Kingston, Ontario, Canada.

Yu, J.X.Z., et al., "High-quality percussion drilling of silicon with a CW fiber laser", Department of Physics, Engineering Physics and Astronomy, Queen's University, Kingston, Ontario, Canada, Jan. 27, 2010.

Patel, N.A., et al., "Guidance of aortic ablation using optical coherence tomography", The International Journal of Cardiovascular Imagining 19, 171-178 (2003).

Wiesemann, W., "Process monitoring and closed-loop control", In: Landolt-Bornstein: Numerical Data and Functional Relationships in Science and Technology, Group VIII: Advanced Materials and Technologies, vol. 1: Laser Physics and Application, subvolume 1C: Laser Applications, Springer, pp. 243-275 (2004).

International Search Report and Written Opinion for PCT/CA2014/000273, dated Jun. 26, 2014.

Extended European Search Report for European Patent Application No. 147644437.1, dated Dec. 5, 2016.

Ngo, A., et al., "Laser Welding of Urinary Tissues, Ex Vivo, Using a Tunable Thulium Fiber Laser", SPIE 6078, Photonic Therapeutics and Diagnostics II, vol. 6078, 60781B-1 - 60781B-8 (2006).

Choi, E.S., et al., "Optical Coherence Tomography in Material Deformation by Using Short Pulse Laser Irradiation", SPIE, 6847, Coherence Domain Optical Methods and Optical Coherence Tomography in Biomedicine Xii, 68470W-1 - 68470W-8 (2008).

Third Party Submission filed on Jun. 3, 2013 for U.S. Appl. No. 13/245,334.

Third Party Observation filed on Dec. 18, 2014 for EP Patent Application No. 11826290.6.

Schmitt, R., et al., "Inline process metrology system for the control of laser surface structuring processes", Physics Procedia 39, 814-822 (2012).

Schmitt, R., "Process monitoring in laser micro machining", Photonik International, 57-59 (2013).

Canadian Examiner's Requisition dated Dec. 15, 2016 for Canadian Patent Application No. 2, 728, 950.

Supplementary European Search Report for European Application No. EP11826290.6, dated Jun. 2, 2017.

Extended European Search Report from related Appln. No. 19880631.7, dated Nov. 25, 2021.

Heintzmann et al., "High-Resolution Image Reconstruction in Fluorescence Microscopy with Patterned Excitation", Applied Optics, Optical Society of America, ,Washington DC, vol. 45, No. 20, pp. 5037-5045, 2006.

Poher et al., "Improved Sectioning in a Slit Scanning Confocal Microscope", Optics Letters, Optical Society of America, vol. 33, No. 16, pp. 1813-1815, 2008.

1st Office Action from related Japanese Appln. No. 2021-523977, dated Apr. 28, 2022. English translation attached.

2nd Office Action from related Japanese Appln. No. 2021-523977, dated Nov. 1, 2022. English translation attached.

Office Action from related Canadian Appln. No. 3,118,389, dated May 30, 2022.

Fukano, et al., "Fluorescence Microscope with a Digital-Micromirror Device" 2004, vol. 33, No. 12, pp. 718-720. English Abstract attached and concise explanation of relevancy can be found in the Japanese Office Actions submitted herewith.

International Search Report from corresponding PCT Appln. No. PCT/CN2019/098364, dated Oct. 16, 2019.

\* cited by examiner

HIGH-THROUGHPUT OPTICAL SECTIONING IMAGING METHOD AND IMAGING SYSTEM

CROSS-REFERENCE TO RELATED APPLICATIONS

The present application is a continuation of International Application No. PCT/CN2019/098364 filed on Jul. 30, 2019, which is based on and claims priority to Chinese Patent Application No. 201811297110.3 filed on Nov. 1, 2018, which is incorporated herein by reference in its entirety.

FIELD

The present disclosure relates to optical imaging technology, and more particularly, to a high-throughput optical sectioning imaging method and imaging system.

BACKGROUND

In the technical field of optical imaging, an out-of-focus background interference of a traditional wide-field microscope makes it impossible to obtain a sharp image of the focal plane. Generally, the background interference can be avoided by cutting a tissue into slices. Optical slicing can achieve an imaging effect similar to that of the tissue slicing by an optical imaging method, and can also be referred to as optical sectioning. Confocal microscopic imaging technology can block a defocusing background interference and only allow the passage of an effective signal of the focal plane by placing a pinhole in front of a detector, thereby achieving an optical sectioning effect. Multi-photon excitation microscopic imaging technology has enough energy to excite fluorescence signal only at a focal point of a sample by utilizing a nonlinear effect, thereby achieving an ideal optical sectioning effect. However, both of the two optical sectioning technologies adopt a point-by-point scanning imaging mode which has an obviously insufficient imaging throughput in comparison with the wide-field imaging mode.

Structured illumination microscopic imaging technology implements modulation of a focal plane signal by superimposing a high-frequency periodic pattern modulation on a wide-field illumination, and a defocusing signal is suppressed due to rapid attenuation of the high-frequency modulation, thereby achieving optical sectioning. In the implementation of this process, at least three original images with different modulation phases are required, and the focal plane signal is demodulated by using a structured illumination microscopic imaging reconstruction algorithm to obtain an optical sectioning image. Compared with the confocal and multi-photon excitation microscopic imaging technologies which also have an optical sectioning ability respectively, the structured illumination microscopic imaging has advantages of high imaging throughput due to the wide-field imaging manner. When a large-size sample needs to be imaged, the structured illumination microscopic imaging technology generally needs to use a mosaic stitching method to expand the imaging field. In this way, most of the time spent for imaging the large-size sample is used for movement of the sample between the mosaics, therefore the overall imaging speed is limited. In order to avoid an excessive mosaic stitching, Chinese patent application No. 201310131718. X discloses a structured light fast scan imaging method which uses line scanning and strip imaging to improve the imaging speed, and uses structured illumination to suppress the background interference, thereby realizing acquiring an optical sectioning image of a large-size sample quickly. However, this method also needs to scan back and forth the imaging area of the sample three times to obtain raw data required for reconstruction of a structured illumination microscopic optical sectioning image, and therefore sacrifices the imaging speed. In addition, this imaging method needs to use a light beam modulation device in a strip imaging system to achieve modulation of the illumination light field, thereby increasing the complexity of the system. Meanwhile, because it uses a conventional structured illumination microscopic imaging method, imaging quality is highly dependent on the contrast of the modulation pattern. Therefore, it is necessary to develop a simple and efficient high-throughput optical sectioning imaging method and imaging system.

SUMMARY

An object of the present disclosure is to overcome the above technical deficiencies, propose a high-throughput optical sectioning imaging method and imaging system, and solve the technical problems of the structured illumination microscopic imaging technology in the prior art having a low imaging speed of a large-size sample, requiring additional modulation elements, being highly dependent on the contrast of the modulation pattern, and having a complex demodulation algorithm for reconstruction of an optical sectioning image.

To achieve the above technical object, the technical solution of the present disclosure provides a high-throughput optical sectioning imaging method which includes the following steps:

at S1, modulating a light beam into a modulated light beam capable of being focused on a focal plane of an objective lens and being defocused on a defocusing plane of the objective lens, the modulated light beam having incompletely identical modulated intensities on the focal plane of the objective lens;

at S2, imaging, by a camera, in different rows of pixels, a same sample under illumination of the modulated light beam to form sample images, a formula expression of the formed sample image being $$I(i)=I^{in}f(i)+I^{out},$$

where $I(i)$ is a sample image formed in an $i^{th}$ row of pixels, $f(i)$ is a modulation intensity corresponding to the sample image $I(i)$, $I^{in}$ is a focal plane image of the sample image, and $I^{out}$ is a defocusing plane image of the sample image;

at S3, obtaining focal plane images of the sample images in the different rows of pixels by demodulating the sample images according to a demodulation algorithm, the focal plane image being an optical sectioning image, and a demodulation formula of the demodulation algorithm being $$I^{in}=c\times|\beta I_1-\alpha I_2|,$$

where $\alpha$ and $\beta$ are positive integers, c is a constant greater than 0, $I_1$ is an accumulated sum of sample images acquired in $\alpha$ pixels, and $I_2$ is an accumulated sum of sample images acquired in $\beta$ pixels; an accumulated value of modulation intensities corresponding to the sample images in the $\alpha$ pixels is different from an accumulated value of modulation intensities corresponding to the sample images in the $\beta$ pixels.

Meanwhile, the present disclosure also provides a high-throughput optical sectioning imaging system which includes:

a light beam modulation module configured to modulate a light beam into a modulated light beam capable of being focused on a focal plane of an objective lens and being defocused on a defocusing plane of the objective lens, the modulated light beam having incompletely identical modulated intensities on the focal plane of the objective lens;

an imaging module configured to image by a camera, in different rows of pixels, a same sample under illumination of the modulated light beam to form sample images, a formula expression of the formed sample image being $I(i)=I^{in}f(i)+I^{out}$, where $I(i)$ is a sample image formed in an $i^{th}$ row of pixels, $f(i)$ is a modulation intensity corresponding to the sample image $I(i)$, $I^{in}$ is a focal plane image of the sample image, and $I^{out}$ is a defocusing plane image of the sample image;

a demodulation module configured to obtain focal plane images of the sample images in the different rows of pixels by demodulating the sample images according to a demodulation algorithm, the focal plane image being an optical sectioning image, and a demodulation formula of the demodulation algorithm being $I^{in}=c\times|\beta I_1-\alpha I_2|$, where $\alpha$ and $\beta$ are positive integers, c is a constant greater than 0, $I_1$ is an accumulated sum of sample images acquired in $\alpha$ pixels, and $I_2$ is an accumulated sum of sample images acquired in $\beta$ pixels; an accumulated value of modulation intensities corresponding to the sample images in the $\alpha$ pixels is different from an accumulated value of modulation intensities corresponding to the sample images in the $\beta$ pixels.

Compared with the prior art, the present disclosure performs illumination by a light beam having incompletely identical modulated intensities, images a same sample in different rows of pixels, and obtain a focal plane image by using a simpler demodulation algorithm, which simplifies a structured illumination microscopic reconstruction algorithm, improves reconstruction efficiency, and improves an imaging speed of large-size samples.

DETAILED DESCRIPTION

In order to make objects, technical solutions, and advantages of the present disclosure more apparent, the present disclosure will be further described in detail below with reference to the accompanying drawings and embodiments.

It should be appreciated that the specific embodiments described herein are merely intended to explain the present disclosure and are not intended to limit the present disclosure.

Figure 1:
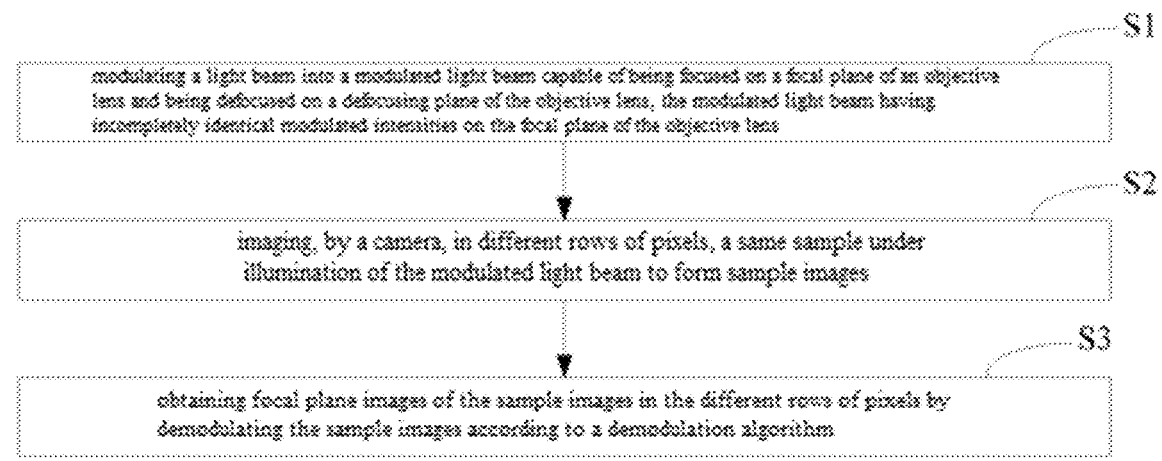
FIG. 1 is a flowchart of a high-throughput optical sectioning imaging method of the present disclosure.
Figure 2:
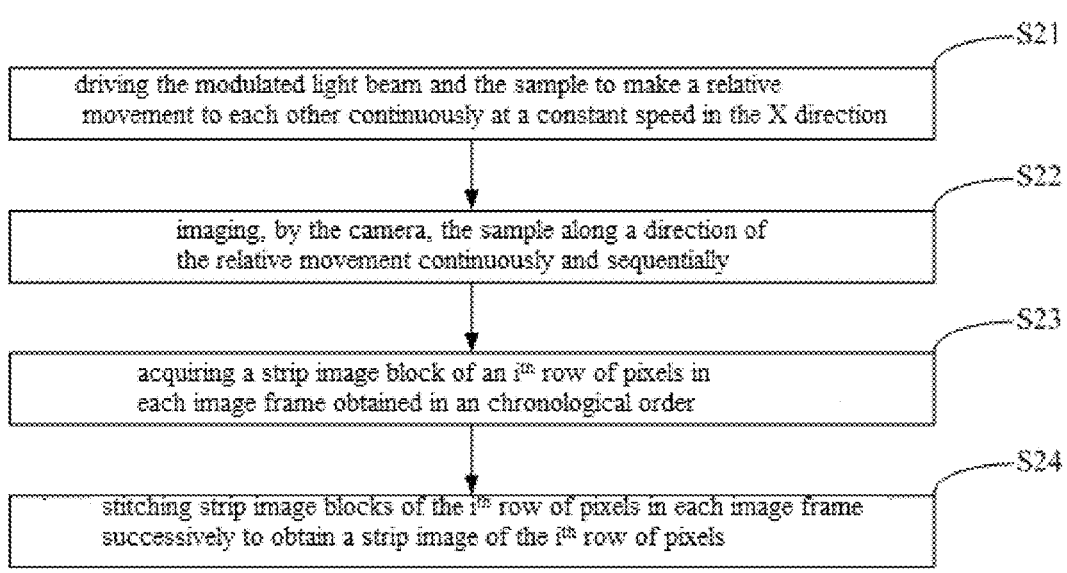
FIG. 2 is a sub-flowchart in a high-throughput optical sectioning imaging method of the present disclosure.
Figure 3:
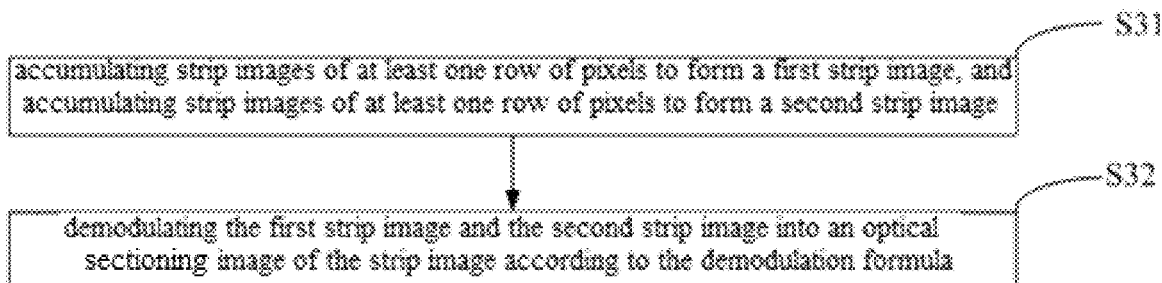
FIG. 3 is another sub-flowchart in a high-throughput optical sectioning imaging method of the present disclosure.

As shown in FIGS. 1-3, the present disclosure provides a high-throughput optical sectioning imaging method which may include the following steps.

At S1, a light beam is modulated into a modulated light beam capable of being focused on a focal plane of an objective lens and capable of being defocused on a defocusing plane of the objective lens, the modulated light beam having incompletely identical modulated intensities on the focal plane of the objective lens.

Particularly, when modulated, a light beam is firstly shaped into a linear light beam. Then, the linear light beam is modulated into a modulated light beam for linear light illumination. This embodiment allows a sample to be illuminated by a linear modulated light beam capable of being focused on a focal plane of an objective lens and being defocused on a defocusing plane of the objective lens, which can facilitate exciting the sample to emit fluorescence, thereby facilitating subsequent imaging.

Here, the above-mentioned modulated light beam in the focal plane of the objective lens has been specifically subject to a waveform modulation with incompletely identical modulation intensities, for example, Gaussian modulation, sinusoidal modulation, or triangular modulation or the like with incompletely identical modulation intensities. Since the illumination light beam of this embodiment adopts a Gaussian beam, the modulated light beam for light illumination formed in this embodiment is formed by the Gaussian modulation. This embodiment may also use other waveform modulations with incompletely identical modulation intensities as needed.

At S2, a sample under illumination of the modulated light beam is imaged in different rows of pixels to form sample images, a formula expression of the formed sample image being $$I(i)=I^{in}f(i)+I^{out}$$

where $I(i)$ is a sample image formed in an $i^{th}$ row of pixels, $f(i)$ is a modulation intensity corresponding to the sample image $I(i)$, $I^{in}$ is a focal plane image of the sample image, and $I^{out}$ is a defocusing plane image of the sample image.

When imaging, step S2 may particularly include the following steps.

At S21, the modulated light beam and the sample are driven to make a relative movement to each other continuously at a constant speed in the X direction.

At S22, the sample is imaged, by a camera, along a direction of the relative movement continuously and sequentially.

In this embodiment, the modulated light beam may be perpendicular to a direction along which the sample moves, and a direction along which the imaging of the sample is performed continuously is the same as a direction along which multiple rows of pixels are arrayed. That is to say, during the process of the relative movement between the sample and the modulated light beam, a part subject to continuous illumination of the sample is imaged continuously. Here, in this embodiment, it can drive the sample to move continuously at a constant speed along a direction perpendicular to the modulated light beam for linear illumination, or it can drive the modulated light beam to move continuously at a constant speed along a direction parallel to the sample, provided that there is a continuous and constant speed relative movement between the modulated light beam and the sample.

Figure 4A:
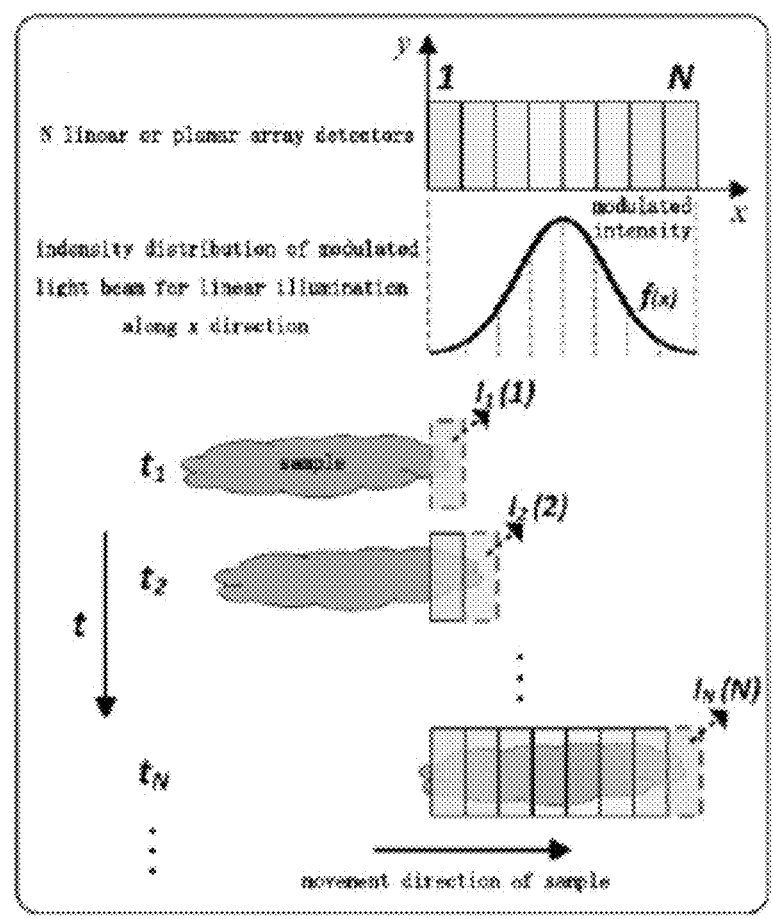
FIGS. 4A-4C is a principle diagram of reconstruction of an optical sectioning image of Embodiment 1 of the present disclosure.

As shown in FIG. 4A, an imaging area in this embodiment has N rows of pixels, where N≥2. Two directions X and Y perpendicular to each other are formed on a plane parallel to an imaging plane of the sample. The modulated light beam has following characteristics in the X and Y directions respectively: the modulated light beam has incompletely identical modulated intensities along the X direction on the N rows of pixels, and the modulated light beam has the same modulated intensity along the Y direction on each row of the N rows of pixels. Furthermore, a distribution direction and width of the N rows of pixels are the same as and in an object-image conjugate relationship with a distribution direction and width of the modulated light beam for linear light illumination respectively, facilitating the correspondence of the imaging area to the modulated light beam for linear light illumination.

Correspondingly, the sample may move relative to the modulated light beam along the X direction, so as to ensure that the direction along which the relative movement between the modulated light beam and the sample is performed is the same as a direction along which the N rows of pixels are arrayed. For ease of operation, as a preferred example of this embodiment, the sample is driven to move and the modulated light beam is set to be stationary. In this case, a movement direction of the sample is set to be the same as the direction along which the N rows of pixels are arrayed, and a single frame exposure duration for imaging is equal to a duration spent by the sample moving by one row of pixels. If an image corresponding to any row of pixels in one image frame is defined as one strip image block, multiple strip image blocks corresponding to any row of pixels in multiple image frames are formed by continuous and sequential imaging of each part of the sample and may be stitched into one strip image, and the N rows of pixels may form N strip images.

Here, in this embodiment, the status of imaging can be determined. When it is determined that continuous imaging is completed, subsequent steps may be performed; and when it is determined that continuous imaging is not completed, the sample is continuously driven to move. In this embodiment, continuous imaging of the sample is realized by continuous and constant speed movement of the sample and thus is equivalent to continuous scanning imaging of the sample. Therefore, after the imaging, it needs to determine whether the continuous scanning imaging of the whole sample is completed, which facilitates ensuring integrity and continuity of the imaging.

At S23, a strip image block $I_t(i)$ of an $i^{th}$ row of pixels in each image frame obtained in a chronological order is acquired, the strip image block being expressed by the formula:

$$I_t(i)=I_m^{in}f(i)+I_m^{out},$$

where $I_t(i)$ is a strip image block corresponding to the $i^{th}$ row of pixels in the $t^{th}$ image frame, $I_m^{in}$ is a focal plane image of the strip image block corresponding to $I_t(i)$, that is, $I_m^{in}$ is a focal plane image of the $m^{th}$ strip image block in a complete strip image, $I_m^{out}$ is a defocusing image of the strip image block corresponding to $I_t(i)$, and f(i) is a modulation intensity corresponding to the row of pixels.

As shown in FIG. 4A, when imaged, the sample moves in the direction along which the imaging pixels are arrayed. Since the single frame exposure duration for imaging is equal to the duration spent by the sample moving by one row of pixels, each row of pixels sequentially form a plurality of strip image blocks along a lengthwise direction of a sample strip which are formed by continuous imaging of the sample.

At S24, strip image blocks of the $i^{th}$ row of pixels in each image frame are stitched successively to obtain a strip image of the $i^{th}$ row of pixels, a formula expression of the strip image being:

$$I(i)=\Sigma_i^{M+i-1}I_t(i),$$

where M is a number of strip image blocks corresponding to the complete strip image, and specifically, the strip image is formed by stitching M strip image blocks, where $I_m^{in}$ is a focal plane image corresponding to the $m^{th}$ strip image block in the strip image, and m≤M.

It should be noted that, the strip image is formed by shifting and stitching a plurality of strip image blocks corresponding to a row of pixels, that is, strip image blocks of N rows of pixels may be respectively stitched to form N strip images.

At S3, focal plane images (i.e., optical sectioning images) of strip images in the different rows of pixels are obtained by demodulating the strip images according to a demodulation algorithm, the demodulation formula of the demodulation algorithm being $$I^{in}=c\times|\beta I_1-\alpha I_2|,$$

where α and β are positive integers, c is a constant greater than 0, $I_1$ is an accumulated sum of strip images acquired in α pixels, and $I_2$ is an accumulated sum of sample images acquired in β pixels; an accumulated value of modulation intensities corresponding to the sample images in the α pixels is different from an accumulated value of modulation intensities corresponding to the sample images in the β pixels.

The step S3 may particularly include following steps.

At S31, strip images of at least one row of pixels are accumulated to form a first strip image, and strip images of at least one row of pixels are accumulated to form a second strip image.

When the N strip images are acquired, one or two or more of the strip images may be arbitrarily selected to accumulate and form the first strip image. Then, the second strip image is obtained by accumulation in the same manner. In order to avoid that the optical sectioning image acquired by the above demodulation algorithm is zero, in this embodiment, an accumulated value of the modulation intensities corresponding to the strip images in α pixels may be different from an accumulated value of the modulation intensities corresponding to the strip images in β pixels.

At S32, the first strip image and the second strip image are demodulated into an optical sectioning image of the strip image according to the demodulation formula. Then we get $I^{in}=\Sigma I_m^{in}$.

For the convenience of explanation of the acquisition process of the strip image of this embodiment, the following embodiments will be described.

Embodiment 1: As shown in FIG. 4A, when the sample moves in the direction along which N rows of pixels are arrayed, N+M−1 image frames can be obtained within a time interval from time ti to $t_{N+M-1}$ (M is the number of strip image blocks corresponding to a complete strip image, N is 8 and M is 9 in this embodiment). In addition, each row of pixels in the N+M−1 image frames corresponds to a strip image block. For example, a strip image block $I_1(1)$ of a first row of pixels in a first image frame, a strip image block $I_2(1)$ of the first row of pixels of a second image frame, a strip image block $I_N(1)$ of the first row of pixels of the $N^{th}$ image frame, and a strip image block $I_{N+M-1}(1)$ of the first row of pixels of the $(N+M-1)^{th}$ image frame can be obtained. The strip image block $I_1(1)$, the strip image block $I_2(1)$ to the strip image block $I_{N+M-1}(1)$ may be successively stitched to form a strip image, and each of corresponding second to $N^{th}$ rows of pixels may be stitched to form a corresponding strip image.

Figure 4B:
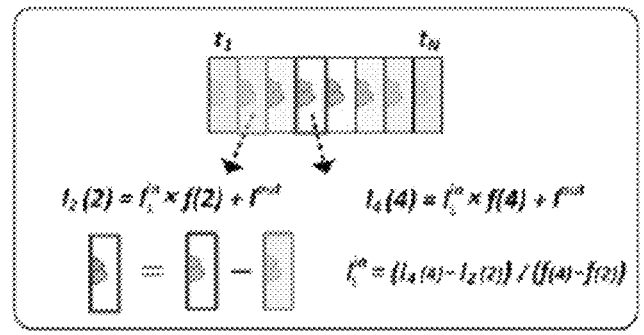
Figure 4C:
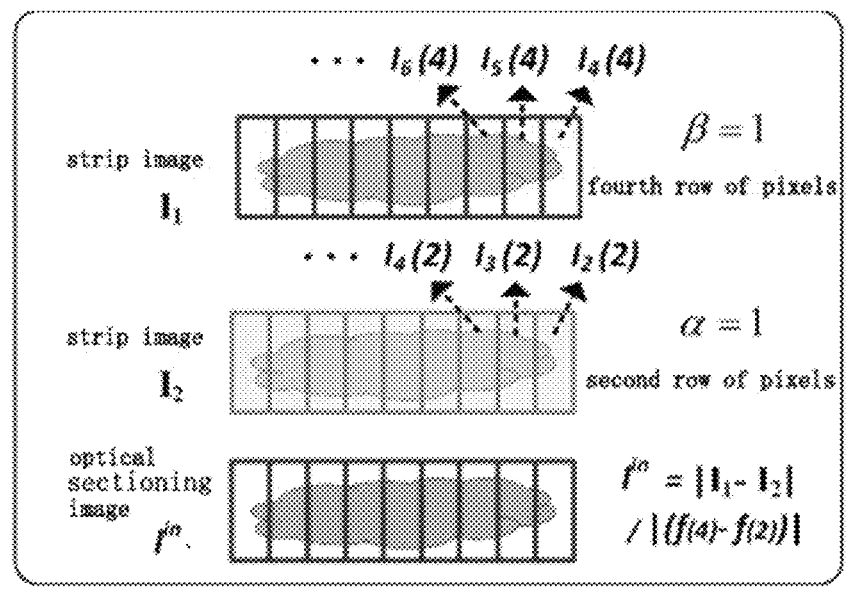

As shown in FIGS. 4B and 4C, in order to explain how to acquire a clearer strip image block and a clearer strip image, firstly, the second row of pixels and the fourth row of pixels are taken as examples for description. Because $I(4)=\Sigma_4^{m+3}I_t(4)$ and $I_t(4)=I_m^{in}f(4)+I_m^{out}$ can be obtained from the formulas of the strip image block and the sample image respectively, the strip image block in the fourth row of pixels of the fourth image frame is $I_4(4)=I_1^{in}f(4)+I_1^{out}$ (where m=1, because a strip image is formed by stitching nine strip image blocks, and the strip image block in the fourth row of pixels in the fourth image frame is the first strip image block of the strip image, that is, $I_1^{in}$ is a focal plane image corresponding to a first strip image block in the strip image). Correspondingly, $I(2)=\Sigma_2^{M+1}I_t(2)$, where $I_t(2)=I_m^{in}f(2)+I_m^{out}$, the strip image block in the second row of pixels of the second image frame is $I_2(2)=I_1^{in}f(2)+I_1^{out}$; $I_1$ is an accumulated sum of the sample images acquired in the fourth row of pixels, that is $I_1=\Sigma_4^{M+3}I_t(4)$, $I_2$ is an accumulated sum of the sample images acquired in the second row of pixels, that is $I_2=\Sigma_2^{M+1}I_t(2)$, the values of $\alpha$ and $\beta$ are both selected as 1. $|I(4)-I(2)|=|\Sigma_4^{M+3}I_t(4)-\Sigma_2^{M+1}I_t(2)|=|f(4)-f(2)|\Sigma I_m^{in}$, therefore $I^{in}=\Sigma I_m^{in}=|\Sigma_4^{M+3}I_t(4)-\Sigma_2^{M+1}I_t(2)|/|f(4)-f(2)|=|I_1-I_2|/|f(4)-f(2)|$.

Figure 5:
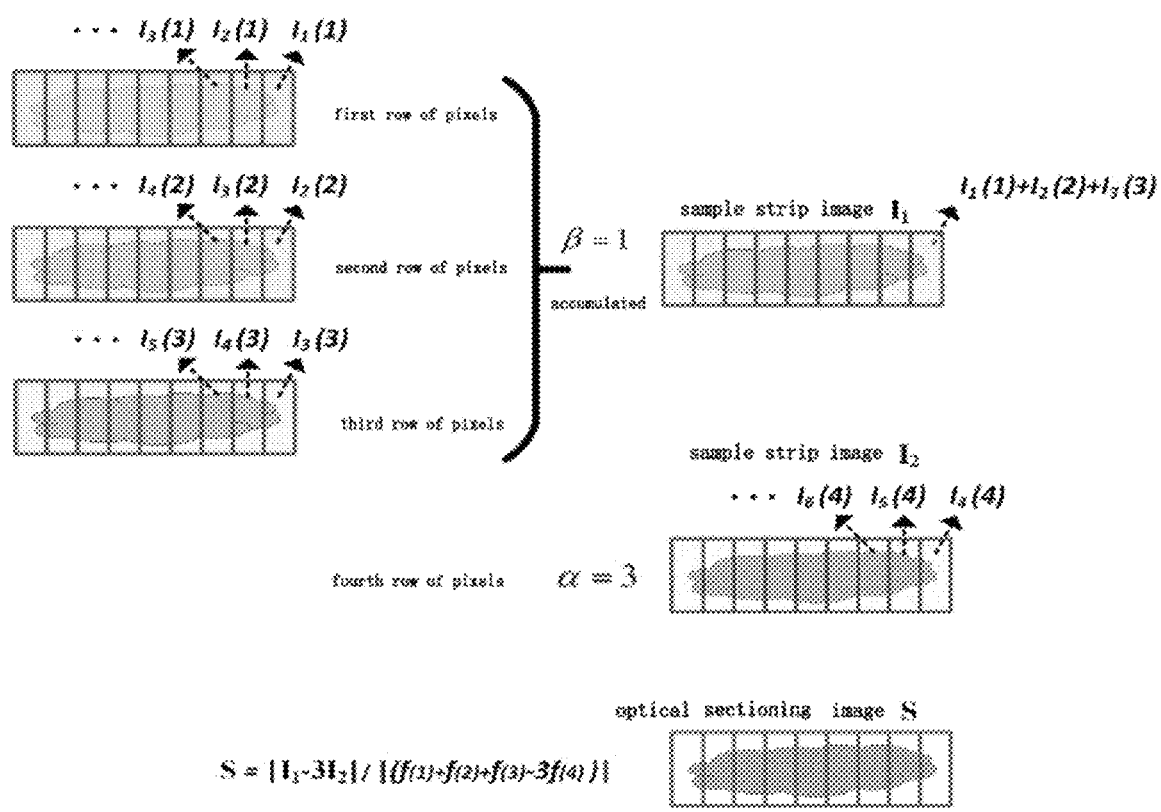
FIG. 5 is a principle diagram of reconstruction of an optical sectioning image of Embodiment 2 of the present disclosure.

Embodiment 2: as shown in FIG. 5, the strip image formed by stitching in the fourth row of pixels is $I(4)=\Sigma_4^{m+3}I_t(4)$, where $I_t(4)=I_m^{in}f(4)+I_m^{out}$; the strip image formed by stitching in the first row of pixels is $I(1)=\Sigma_1^{M}I_t(1)$, where $I_t(1)=I_m^{in}f(1)+I_m^{out}$; the strip image formed by stitching in the second row of pixels is $I(2)=\Sigma_2^{M+1}I_t(2)$, where $I_t(2)=I_m^{in}f(2)+I_m^{out}$; and the strip image formed by stitching in the third row of pixels is $I(3)=\Sigma_3^{M+2}I_t(3)$, where $I_t(3)=I_m^{in}f(3)+I_m^{out}$.

If $I_1$ is an accumulated sum of the sample images acquired in the first, second and third rows of pixels, that is $I_1=\Sigma_1^{M}I_t(1)+\Sigma_2^{M+1}I_t(2)+\Sigma_3^{M+2}I_t(3)$, and $I_2$ is an accumulated sum of the sample images acquired in the fourth row of pixels, that is $I_2=\Sigma_4^{M+3}I_t(4)$, correspondingly, the value of $\alpha$ should be selected as 3, and the value of $\beta$ should be selected as 1. $|(I(1)+I(2)+I(3))-3I(4)|=|(\Sigma_1^{M}I_t(1)+\Sigma_2^{M+1}I_t(2)+\Sigma_3^{M+2}I_t(3))-3\Sigma_4^{M+3}I_t(4)|=|(f(1)+f(2)+f(3))-3f(4)|\Sigma I_m^{in}$ can be obtained from the demodulation formula, therefore $I^{in}=\Sigma I_m^{in}=|(\Sigma_1^{M}I_t(1)+\Sigma_2^{M+1}I_t(2)+\Sigma_3^{M+2}I_t(3))-3\Sigma_4^{M+3}I_t(4)|/|(f(1)+f(2)+f(3))-3f(4)|=|I_1-3I_2|/|(f(1)+f(2)+f(3))-3f(4)|$.

Figure 6:
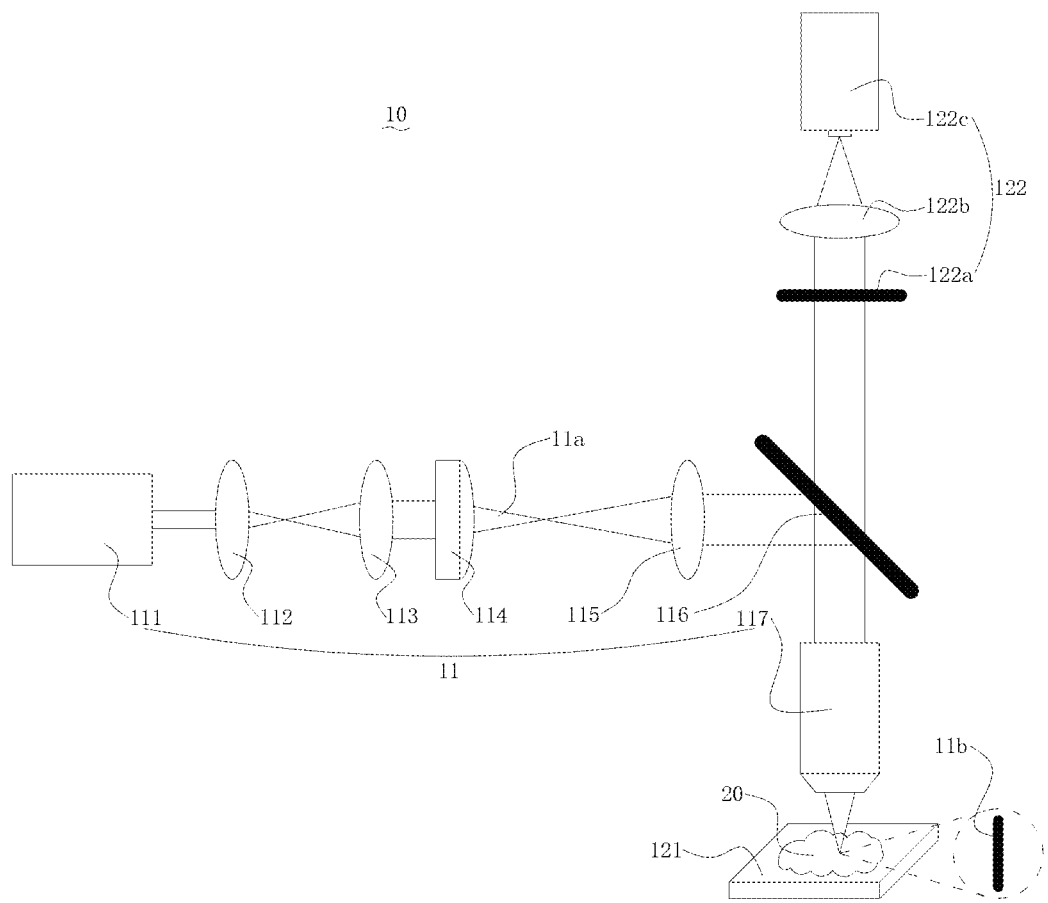
FIG. 6 is a schematic diagram showing an optical configuration of a high-throughput optical sectioning imaging system of the present disclosure.
Figure 7:
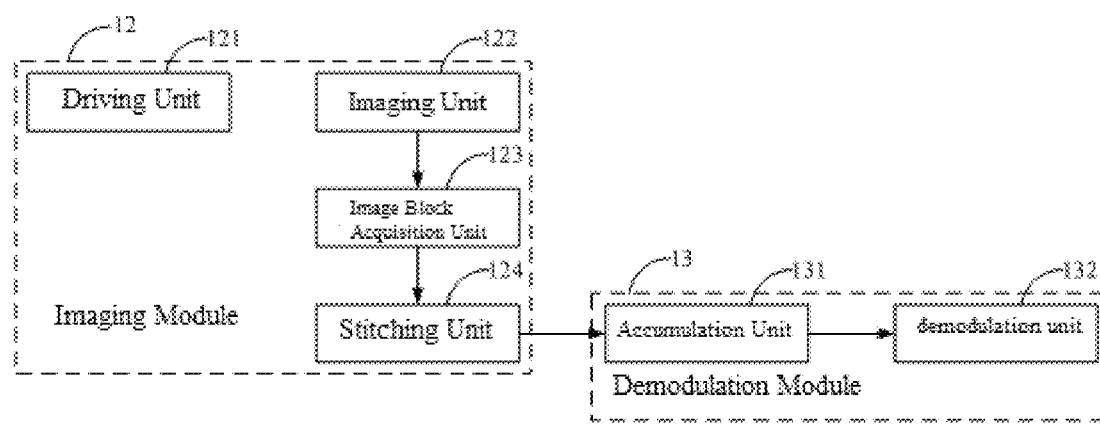
FIG. 7 is a block diagram showing a connection of a high-throughput optical sectioning imaging system of the present disclosure.

For convenience of illustrating this embodiment, as shown in FIGS. 6 and 7, this embodiment also provides a high-throughput optical sectioning imaging system 10 including a light beam modulation module 11, an imaging module 12 and a demodulation module 13.

The light beam modulation module 11 is configured to modulate a light beam into a modulated light beam capable of being focused on a focal plane of an objective lens and capable of being defocused on a defocusing plane of the objective lens, and the modulated light beam has incompletely identical modulated intensities on the focal plane of the objective lens.

The light beam modulation module 11 in this embodiment includes a shaping optical path for shaping illumination light into a linear light beam and a modulation optical path for modulating the linear light beam into a modulated light beam for linear light illumination. The shaping optical path includes a laser light source 111, a first lens 112, a second lens 113 and a cylindrical lens 114 which are sequentially arranged along a travel direction of the illumination light. The modulation optical path includes a third lens 115 configured to modulate divergent light of the linear light beam into parallel light, a dichroic mirror 116 configured to modulate an incident direction of the linear light beam, and an objective lens 117 arranged coaxially with the linear light beam the incident direction of which has been modulated.

During the light modulation, the laser light source 111 emits illumination light which is sequentially processed by the first lens 112 and the second lens 113 so as to be an expanded light beam. The expanded light beam is shaped by the cylindrical lens 114 to form a linear light beam 11a. The linear light beam 11a is a divergent light. Then, the linear light beam 11a forms the parallel light rays after passing through the third lens 115. Then, the dichroic mirror 116 changes an incident direction of the line light beam 11a, and then the linear light beam 11a enters the objective lens 117 to form a modulated linear light beam 11b which is capable of being focused on the focal plane of the objective lens 117 and capable of being defocused on a defocusing plane of the objective lens 117. In order to facilitate subsequent imaging, an optical axis of the modulated linear light beam 11b is perpendicular to an optical axis of the illumination light and an optical axis of the linear light beam 11a which has not been reflected, that is, the first lens 112, the second lens 113, the cylindrical lens 114 and the third lens 115 are arranged coaxially, and central axes of the first lens 112, the second lens 113, the cylindrical lens 114 and the third lens 115 are arranged perpendicular to a central axis of the objective lens 117. Furthermore, the angle between the dichroic mirror 116 and the optical axis of the modulated light beam 11b for linear illumination is 45 degrees, ensuring that the width of the linear light beam 11a after being reflected by the dichroic mirror 116 does not change.

The imaging module 12 is configured to employ a camera to image, in different rows of pixels, a same sample under illumination of the modulated light beam. The imaging module 12 includes a driving unit 121, an imaging unit 122, an image block acquisition unit 123 and a stitching unit 124. A formula expression of a sample image formed by imaging using the imaging module 12 is $I(i)=I^{in}f(i)+I^{out}$, where $I(i)$ is a sample image formed in the $i^{th}$ row of pixels, $f(i)$ is a modulation intensity corresponding to the sample image $I(i)$, $I^{in}$ is a focal plane image of the sample image, and $I^{out}$ is a defocusing plane image of the sample image.

The driving unit 121 is configured to drive the modulated light beam 11b and the sample 20 to make a relative movement to each other continuously at a constant speed along the X direction, and a single frame exposure duration in the camera is equal to a duration spent by the relative movement by one row of pixels. In order to facilitate the driving, the driving unit 121 in this embodiment may adopt a translation stage which can drive the sample 20 to move continuously at a constant speed along a direction perpendicular to the modulated light beam 11b. The translation stage 121 may be a motorized translation stage 121 and may be located directly below the objective lens 117. The sample 20 is provided on the translation stage 121 and can move along with the translation stage 121. In order to control imaging precision, an upper surface of the translation stage 121 is perpendicular to the optical axis of the modulated linear light beam 11b. The sample 20 is arranged on the translation stage 121 and passes through a modulated region of the modulated linear light beam 11b during the process of movement. Under the effect of the modulated linear light beam 11b, the sample 20 is excited to emit fluorescence. The translation stage 121 in this embodiment is in a horizontal state, and the modulated linear light beam 11b is parallel with the translation stage and is perpendicular to the movement direction of the sample 20.

The imaging unit 122 is configured to perform successive imaging along the direction in which the sample 20 performs the above relative movement. Particularly, the imaging unit 122 is configured to perform successive and continuous imaging as the sample 20 moves continuously, which can be realized by an imaging optical path. The imaging optical path is composed of an emission filter 122a, a tube lens 122b and a camera 122c which are located directly above the objective lens 117. The fluorescence from the excited sample 20 passes through the objective lens 117, the dichroic mirror 116, the emission filter 122a and the tube lens 122b sequentially, and then is detected and imaged by the camera 122c. Here, the camera 122c of this embodiment may be a planar array Charge-coupled device (CCD) or planar array Complementary Metal Oxide Semiconductor (CMOS) camera having a function of Sub-array or Region of interest (ROI), or may be a linear array CCD or linear array CMOS camera having an array mode. In order to facilitate subsequent reconstruction of an optical sectioning image, an imaging area of the camera 122c in this embodiment has N rows of pixels, where N≥2, and the imaging direction of the camera 122c and the width of the imaging area are the same as the direction and width of the modulated light beam 11b for linear light illumination, respectively. A single frame exposure duration of the camera 122c is equal to a duration spent by the translation stage driving the sample 20 to move by one row of pixels, which is described above and is omitted here.

The image block acquisition unit 123 is configured to acquire a strip image block of an $i^{th}$ row of pixels in each image frame obtained in an chronological order, and the strip image block is expressed by the formula:

$$I_t(i) = I_m^{in} f(i) + I_m^{out}$$

where $I_t(i)$ is a strip image block corresponding to the $i^{th}$ row of pixels in the $t^{th}$ image frame, $I_m^{in}$ is a focal plane image of the strip image block corresponding to $I_t(i)$, that is, $I_m^{in}$ is a focal plane image of the $m^{th}$ strip image block in a complete strip image, $I_m^{out}$ is a defocusing image of the strip image block corresponding to $I_t(i)$, and $f(i)$ is a modulation intensity corresponding to the row of pixels.

The stitching unit 124 is configured to successively stitch strip image blocks of the $i^{th}$ row of pixels in each image frame to obtain a strip image of the $i^{th}$ row of pixels according to the formula of $I(i) = \sum_i^{M+i-1} I_t(i)$, where M is a number of strip image blocks corresponding to the complete strip image, and specifically, the strip image is formed by stitching M strip image blocks, where $I_m^{in}$ is a focal plane image corresponding to the $m^{th}$ strip image block in the strip image, and m≤M.

The demodulation module 13 is configured to demodulate multiple sample images using the demodulation algorithm to obtain focal plane images of the multiple sample images. The demodulation module 13 may include an image accumulation unit 131 and a demodulation unit 132. The sample image in this embodiment is a strip image. Therefore, the image accumulation unit 131 is configured to accumulate strip images of at least one row of pixels to form a first strip image, and accumulate strip images of at least one row of pixels to form a second strip image. The demodulation unit 132 is configured to demodulate the first strip image and the second strip image into optical sectioning images of the strip images according to the demodulation algorithm. It should be noted that, the focal plane image in this embodiment is an optical sectioning image. Here, the demodulation formula of the demodulation algorithm is $I^{in} = c \times |\beta I_1 - \alpha I_2|$, where $\alpha$ and $\beta$ are positive integers, c is a constant greater than 0, $I_1$ is an accumulated sum of strip images acquired in $\alpha$ pixels, and $I_2$ is an accumulated sum of sample images acquired in $\beta$ pixels; an accumulated value of modulation intensities corresponding to the sample images in the $\alpha$ pixels is different from an accumulated value of modulation intensities corresponding to the sample images in the $\beta$ pixels.

Specific functions and actions of the image block acquisition unit 123, the stitching unit 124, the image accumulation unit 131 and the demodulation unit 132 have been described in detail in the above.

Specific embodiments disclosed above in the disclosure can not construed as limiting the scope of protection of the disclosure. Any of various other corresponding changes and modifications made in accordance with the technical conception of the present disclosure should be included within the scope of protection of the claims of the present disclosure.

What is claimed is:

1. A high-throughput optical sectioning imaging method, comprising the following steps:
   at S1, modulating a light beam into a modulated light beam capable of being focused on a focal plane of an objective lens and being defocused on a defocusing plane of the objective lens, the modulated light beam having incompletely identical modulated intensities on the focal plane of the objective lens;
   at S2, imaging, by a camera, in different rows of pixels, a same sample under illumination of the modulated light beam to form sample images, a formula expression of the formed sample image being:

$$I(i) = I^{in} f(i) + I^{out},$$

where I(i) is a sample image formed in an $i^{th}$ row of pixels, f(i) is a modulation intensity corresponding to the sample image I(i), $I^{in}$ is a focal plane image of the sample image, and $I^{out}$ is a defocusing plane image of the sample image;
   at S3, obtaining focal plane images of the sample images in the different rows of pixels by demodulating the sample images according to a demodulation algorithm, the focal plane image being an optical sectioning image, and a demodulation formula of the demodulation algorithm being $I^{in} = c \times |\beta I_1 - \alpha I_2|$,
   where $\alpha$ and $\beta$ are positive integers, c is a constant greater than 0, $I_1$ is an accumulated sum of sample images acquired in $\alpha$ pixels, and $I_2$ is an accumulated sum of sample images acquired in $\beta$ pixels; an accumulated value of modulation intensities corresponding to the sample images in the $\alpha$ pixels is different from an accumulated value of modulation intensities corresponding to the sample images in the $\beta$ pixels.

2. The high-throughput optical sectioning imaging method according to claim 1, wherein an imaging area of the camera has N rows of pixels, where N≥2; two directions X and Y perpendicular to each other are formed on a plane parallel to an imaging plane of the sample, and the modulated light beam has following characteristics in the X and Y directions respectively: the modulated light beam having incompletely identical modulated intensities along the X direction on the N rows of pixels, and the modulated light beam having a same modulated intensity along the Y direction on each row of the N rows of pixels; the pixel being a row pixel, and the sample image being a strip image.

3. The high-throughput optical sectioning imaging method according to claim 2, wherein the step S2 comprises:
at S21, driving the modulated light beam and the sample to make a relative movement to each other continuously at a constant speed in the X direction;
at S22, imaging, by the camera, the sample along a direction of the relative movement continuously and sequentially;
at S23, acquiring a strip image block $I_t(i)$ of an $i^{th}$ row of pixels in each image frame obtained in a chronological order, a formula expression of the strip image block being:

$$I_t(i)=I_m^{in}f(i)+I_m^{out},$$

where $I_t(i)$ is a strip image block corresponding to the $i^{th}$ row of pixels in a $t^{th}$ image frame, $I_m^{in}$ is a focal plane image of the strip image block corresponding to $I_t(i)$, that is, $I_m^{in}$ is a focal plane image of a $m^{th}$ strip image block in a complete strip image, $I_m^{out}$ is a defocusing plane image of the strip image block corresponding to $I_t(i)$, and f(i) is a modulation intensity corresponding to the $i^{th}$ row of pixels; and
At S24, stitching strip image blocks of the $i^{th}$ row of pixels in each image frame successively to obtain a strip image of the $i^{th}$ row of pixels, a formula expression of the strip image being $$I(i)=\Sigma_i^{M+i-1}I_t(i)$$

where M is a number of strip image blocks corresponding to the complete strip image, and m≤M.

4. The high-throughput optical sectioning imaging method according to claim 3, wherein a single frame exposure duration in the camera is equal to a duration spent by the relative movement by one row of pixels.

5. The high-throughput optical sectioning imaging method according to claim 4, wherein a distribution direction and width of the N rows of pixels are the same as and in an object-image conjugate relationship with a distribution direction and width of the modulated light beam respectively.

6. The high-throughput optical sectioning imaging method according to claim 5, wherein the step S3 comprises:
at S31, accumulating strip images of at least one row of pixels to form a first strip image, and accumulating strip images of at least one row of pixels to form a second strip image; and
at S32, demodulating the first strip image and the second strip image into the optical sectioning image of the strip image according to the demodulation formula, then $I^{in}=\Sigma_m I_m^{in}$.

7. The high-throughput optical sectioning imaging method according to claim 1, wherein the modulated light beam is a linear modulated light beam.

8. A high-throughput optical sectioning imaging system, comprising:
a light beam modulation module configured to modulate a light beam into a modulated light beam capable of being focused on a focal plane of an objective lens and being defocused on a defocusing plane of the objective lens, the modulated light beam having incompletely identical modulated intensities on the focal plane of the objective lens;
an imaging module configured to image by a camera, in different rows of pixels, a same sample under illumination of the modulated light beam to form sample images, a formula expression of the formed sample image being $I(i)=I^{in}f(i)+I^{out}$, where I(i) is a sample image formed in an $i^{th}$ row of pixels, f(i) is a modulation intensity corresponding to the sample image I(i), $I^{in}$ is a focal plane image of the sample image, and $I^{out}$ is a defocusing plane image of the sample image;
a demodulation module configured to obtain focal plane images of the sample images in the different rows of pixels by demodulating the sample images according to a demodulation algorithm, the focal plane image being an optical sectioning image, and a demodulation formula of the demodulation algorithm being $I^{in}=c\times|\beta I_1-\alpha I_2|$, where $\alpha$ and $\beta$ are positive integers, c is a constant greater than 0, $I_1$ is an accumulated sum of sample images acquired in $\alpha$ pixels, and $I_2$ is an accumulated sum of sample images acquired in $\beta$ pixels; an accumulated value of modulation intensities corresponding to the sample images in the $\alpha$ pixels is different from an accumulated value of modulation intensities corresponding to the sample images in the $\beta$ pixels.

9. The high-throughput optical sectioning imaging system according to claim 8, wherein an imaging area of the camera has N rows of pixels, where N≥2; two directions X and Y perpendicular to each other are formed on a plane parallel to an imaging plane of the sample, and the modulated light beam has following characteristics in the X and Y directions respectively: the modulated light beam having incompletely identical modulated intensities along the X direction on the N rows of pixels, and the modulated light beam having a same modulated intensity along the Y direction on each row of the N rows of pixels; the pixel being a row pixel, and the sample image being a strip image; a distribution direction and width of the N rows of pixels are the same as and in an object-image conjugate relationship with a distribution direction and width of the modulated light beam respectively.

10. The high-throughput optical sectioning imaging system according to claim 9, wherein the imaging module comprises:
a driving unit configured to drive the modulated light beam and the sample to make a relative movement to each other continuously at a constant speed in the X direction, a single frame exposure duration in the camera being equal to a duration spent by the relative movement by one row of pixels;
an imaging unit configured to image the sample by the camera along a direction of the relative movement sequentially;
an image block acquisition unit configured to acquire a strip image block of an $i^{th}$ row of pixels in each image frame obtained in an chronological order, a formula expression of the strip image block being $I_t(i)=I_m^{in}f(i)+I_m^{out}$, where $I_t(i)$ is a $m^{th}$ strip image block corresponding to the $i^{th}$ row of pixels in the $i^{th}$ image frame, $I_m^{in}$ is a focal plane image of the strip image block corresponding to $I_t(i)$, $I_m^{out}$ is a defocusing plane image of the strip image block corresponding to $I_t(i)$, and f(i) is a modulation intensity corresponding to the $i^{th}$ row of pixels; and
a stitching unit configured to stitch strip image blocks of the $i^{th}$ row of pixels in each image frame successively to obtain a strip image of the $i^{th}$ row of pixels, a formula expression of the strip image being $I(i)=\Sigma_i^{M+i-1}I_t(i)$, where M is a number of strip image blocks corresponding to the complete strip image;

the demodulation unit comprises:
an image accumulation unit configured to accumulate strip images of at least one row of pixels to form a first strip image, and accumulate strip images of at least one row of pixels to form a second strip image; and
a demodulation unit configured to demodulate the first strip image and the second strip image into an optical sectioning image of the strip image according to the demodulation formula, then $I^{in}=\Sigma I_m^{in}$.

* * * * *